United States Patent [19]
Morris et al.

[11] 3,855,649
[45] Dec. 24, 1974

[54] WASTE DRAIN CONNECTION FOR PLUMBING FIXTURES

[75] Inventors: Earl L. Morris; Theodore J. Sally, both of Whittier, Calif.

[73] Assignee: Acorn Engineering Company, Industry, City of Industry, Calif.

[22] Filed: Oct. 10, 1972

[21] Appl. No.: 296,044

[52] U.S. Cl. ..................................... 4/252 R, 4/58
[51] Int. Cl. ............................................. E03d 11/00
[58] Field of Search ...... 4/206, 211, 252 R; 285/56, 285/58

[56] References Cited
UNITED STATES PATENTS

| | | | |
|---|---|---|---|
| 845,534 | 2/1907 | Delanoy | 285/58 |
| 939,001 | 11/1909 | Forster et al. | 285/59 |
| 1,490,805 | 4/1924 | Divekey | 285/59 X |
| 1,706,285 | 3/1929 | Frye | 4/252 R |
| 1,988,298 | 1/1935 | Burkett | 285/58 X |
| 2,208,199 | 7/1940 | Sisk | 4/252 R |
| 3,409,918 | 11/1968 | Gaddy | 4/252 R |

Primary Examiner—Edward L. Roberts
Attorney, Agent, or Firm—Ben E. Lofstedt

[57] ABSTRACT

A vandal-proof waste drain connection for independently supported plumbing fixtures having a pipe body with two open ends and a gasket compression ring and alignment yoke joined to the body of the pipe. A receptacle mounted to the plumbing fixture drain outlet is adapted to receive a fluid sealing gasket. The gasket compression ring is formed as an integral part of the yoke, the yoke having at least two oppositely disposed, radially extending arms adapted to receive threaded studs. The other end of the studs are anchored to the plumbing fixture backside so as not to be accessible from the exposed or user side of the plumbing fixture. The other end of the pipe body is slideably mated to an externally threaded adapter sleeve which has an external wrench-gripping surface for rotating the adapter so that the adapter may be threadably connected to a waste receiving pipe.

6 Claims, 4 Drawing Figures

WASTE DRAIN CONNECTION FOR PLUMBING FIXTURES

BACKGROUND OF THE INVENTION

1. Field of the Invention

The present invention lies in the field of vandal-proof waste drain connections for independently supported plumbing fixtures.

2. Description of the Prior Art

Waste drain connections for plumbing fixtures in the prior art are generally installable and removable from the exposed plumbing fixture or user side. However, it is only with great expense and difficulty that such waste drain connections are rendered vandal-proof. To be vandal-proof, the connection cannot be removable or tampered with from the user-exposed side of the plumbing fixture.

Such a feature as being vandal-proof is a highly desirable commerical feature, especially when applied to such plumbing fixtures as are installed and used in public institutions, such as jails or prisons.

Additionally, such waste drain connections are frequently constructed as a part of a carrier and adapter assembly, wherein the waste connection provides a carrier for structurally supporting a plumbing fixture, and to adapt the drain outlet of the plumbing fixture to the soil stack which receives the waste from the waste outlet of the plumbing fixture. In such a carrier and adapter assembly, the waste connection is utilized as an essential element for structurally supporting the plumbing fixture.

Examples which serve to illustrate these characteristics of the prior art are illustrated and clearly disclosed in U.S. Pat. Nos. 2,795,789; 3,020,565; and 3,540,065.

In reviewing such examples, it may be readily seen that such assemblies are relatively complex, expensive to construct and require a relatively lengthy period of time to install. Again, such assemblies are installable and removable in a commercially convenient manner solely from the exposed or user side of the plumbing fixture.

Due to the fact that many of such assemblies in the prior art possess or use threaded studs which parallel the length of the pipe connection in the adapter assemblies and are laterally spaced therefrom, a larger hole must be created in the wall or partition through which the connection must pass.

In addition, the plumbing fixture must generally be removed before such waste connections are accessible for periodic maintenance, adjustment, or replacement.

When compression ring and alignment yokes are used to mate with and comprises a fluid-sealing gasket disposed between the plumbing fixture drain outlet, the compression force and alignment adjustment can oftentimes only be accomplished from the user or exposed side of the plumbing fixture. Such accessibility is undesirable when plumbing fixtures are used in various public or penal institutional facilities.

SUMMARY OF THE INVENTION AND OBJECTS

The present invention relates to a waste connection which connects the drain outlet of a plumbing fixture to the waste inlet of a soil or waste drain pipe.

Fundamentally, the present invention comprises a vandal-proof waste drain connection for independently supported plumbing fixtures, such as are supported by a wall or partition, which include, but should not in any way be construed as being solely limited thereto, wall or partition-mounted plumbing fixtures, floor-mounted plumbing fixtures, and plumbing fixtures which are supported by both the floor and wall or partition.

Further, the waste drain connection has a pipe body with two open ends and a gasket compression ring and alignment yoke joined to the pipe body near one end thereof. A receptacle mounted to the plumbing fixture waste drain outlet is adapted to receive a fluid-sealing gasket. The compression ring of the compression ring and alignment yoke is disposed in an abutting relationship to the sealing surface of the gasket. The gasket compression ring is formed as an integral part of the alignment yoke, wherein the yoke has at least two oppositely disposed, radially extending apertured arms or slotted lugs, which are adapted to receive the threaded anchoring studs. The studs are anchored to the rear face of the plumbing fixture. The other open end of the pipe is slideably mated to an externally threaded adapter, which has an external wrench-gripping surface for rotating the adapter body, wherein the threaded portion of the adapter may be threadably mated to a waste drain pipe inlet having a matching threaded receiving end therein so as to effect a fluid seal therebetween and to structurally support the adapter end of the pipe.

One object of the present invention is to provide a waste drain connection for plumbing fixtures which does not serve to support any substantial weight of the plumbing fixture, and, in fact, is non-supporting.

Another object is to provide a relatively simple, inexpensive waste connection between the soil pipe and the waste outlet or drain of a plumbing fixture.

A still further object of the invention is to provide a vandal-proof waste-drain connection for plumbing fixtures.

Another object of the invention is to provide a waste drain connection for plumbing fixtures which may be installed and totally removed from the pipe chase area behind the plumbing fixture without interfering with or disturbing the plumbing fixture or the structural support for the plumbing fixture.

Another important object of the invention is to provide a means for aligning and adjusting the fluid-sealing relationship between the plumbing fixture drain outlet and the waste drain connection which is accessible only from the pipe chase area and not from the exposed or user side of the plumbing fixture.

A still further object of the invention is to provide a rapid and simple means for adapting the length of the pipe portion of the waste connection body to various installation depths, either in the manufacturing phase or during field installation.

An even further object of the invention is to provide a waste connection device which may be easily adaptable to existing waste-receiving pipe or soil pipe installations.

Another important object of the present invention is to provide a waste connection which requires a substantially smaller aperature in the wall between the plumbing fixture and the waste receiving pipe or soil pipe inlet than waste connections in the prior art.

This invention and its objects and features will be better and more clearly understood from the following description and explanation, when read in connection with the accompanying drawing, in which:

DESCRIPTION OF THE PREFERRED EMBODIMENTS

Figure 1:
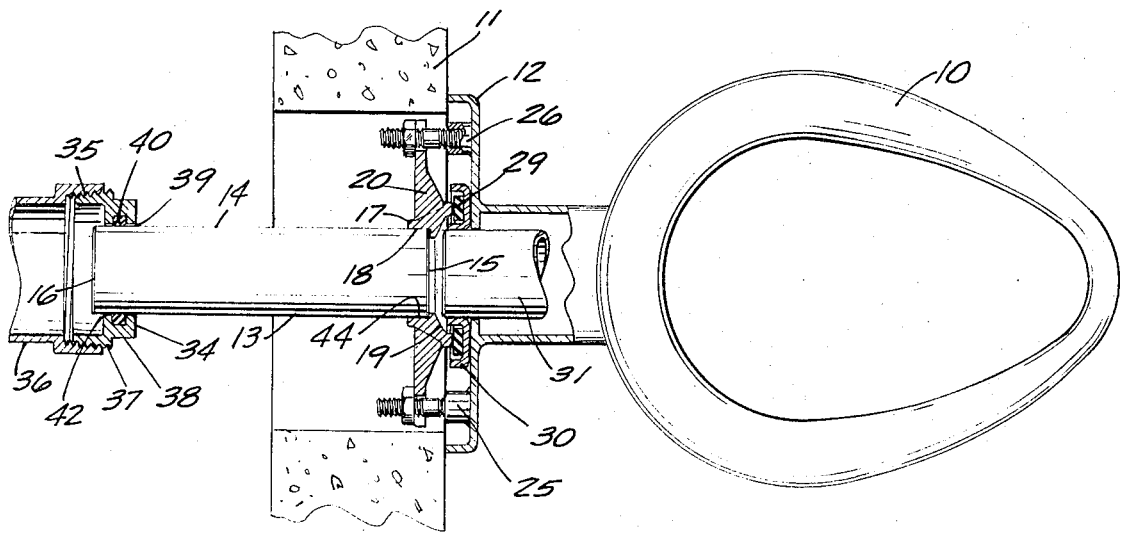
FIG. 1 is a plan view of the waste connection, shown partially in section, connected between a well-hung toilet fixture and a waste-receiving pipe, wherein the waste-receiving pipe is disposed behind the wall in the pipe-chase area.

Referring to the drawings, a plumbing fixture 10 in the form of a toilet bowl, is shown, of the rear outlet type as distinguished from the floor outlet type, so that the plumbing fixture 10 will be discharged through a rear outlet to the sewer system. Such a rear outlet plumbing fixture 10 as shown, is supported by the wall 11 to which the rear of the plumbing fixture 10 mounting flange 12 is abutted and mounted.

As shown in FIG. 1, the waste connection, generally identified at 13, is comprised of a pipe 14, having two open ends 15, 16, said first open end 15 being joined in such a manner to a compression ring and yoke 17 to effect a fluid seal between the body of the pipe 14 and the compression ring and yoke 17 at the contact surface 18. Typically, the compression ring's bore 44 is slightly larger than the outside diameter of the pipe 14, so that when the bore 44 of the compression ring 19 is placed over the outside diameter of the pipe 14, the bore is placed in contiguous relationship thereto. When so disposed, a suitable fluid seal and structural bond may be effected by either brazing or soldering the contact surface 18, which includes the bore 44 portion and the portion of the outside surface of the pipe 14 as clearly depicted.

Soldering is often preferred in the field as solder and a soldering pot for melting the solder and a solder ladle are generally considered to be common tools of the plumber's trade.

Figures 3, 4:
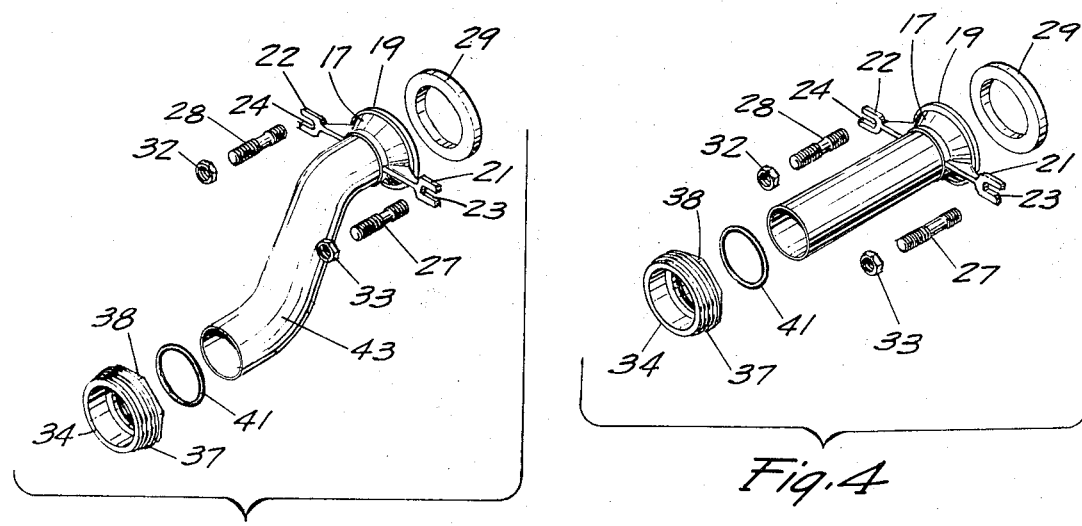
FIG. 3 is an isometric, exploded assembly view of an offset waste connection and its various parts and their interconnection.
FIG. 4 is an isometric, exploded assembly view of a straight-through waste connection and its various parts and their interconnection.
Figure 2:
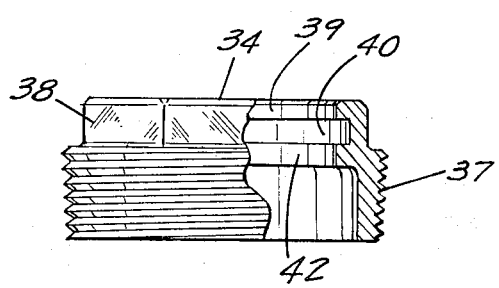
FIG. 2 is a side elevational view, partially in section, of the externally threaded sleeve adapter.

FIGS. 1, 3 and 4 clearly depict the compression ring and alignment yoke 17. As shown, the compression ring and alignment yoke 17, has a compression ring 19 which is coaxially and circumferentially disposed to said pipe 14. The alignment yoke 20 forms an integral combination with the compression ring 19. Typically, the compression ring and alignment yoke 17 is formed of a single cast bronze piece.

The compression ring and alignment yoke 17 has two, symmetrical, radially extending arms 21, 22, having slots 23, 24 in the outer ends thereof. It should be noted that such slots as 23, 24 can be replaced by apertures in the arms 21, 22 to serve the same functional purpose or by merely two openings in the compression ring 19.

Bonded to the rear face of the plumbing fixture mounting flange 12, typically by welding or brazing, are two threaded receptacles 25, 26 for receiving threaded anchoring studs 27, 28.

When the compression ring 19 is placed in an abutting relationship to a fluid-sealing gasket 29, said gasket being adapted to be received into a gasket-receiving receptacle 30, wherein said receptacle is circumferentially disposed around the waste outlet or drain 31 of the plumbing fixture 10, the compression ring 19 is aligned thereto by means of the slots 23, 24 in the arms 21, 22 as the slotted sections are are passed over the bodies of the threaded studs 27, 28 which are threadably anchored to the threaded receptacles 25, 26.

Following the alignment of the compression ring 19 with the gasket 29 as described above, nuts 32, 33 are threadably mated to the studs 28, 27. The nuts 32, 33 are subsequently screwed further and further onto said studs 28, 27 until contact is made with the ends of the arms 22, 21. After such contact is made any further tightening of the nuts 28, 27 will force said arms 22, 21 towards the mounting flange 12, thereby forcing the compression ring 19 against the gasket 29 in a substantially uniformly distributed fashion. Such adjustment is completed when a fluid seal is effected between the compression ring 19, the gasket 29, and the receptacle 30.

At the second open end 16 of the pipe 14, a sleeve adapter 34 is used to adapt the relatively smooth outer body of the pipe 14 to the threaded receptacle 35 of the waste-receiving pipe 36. Circumferentially disposed around one end of the adapter 34 is a threaded portion 37. At the other end and also circumferentially disposed, is a wrench-gripping surface 38. The threaded portion 37 is adapted to be threadably mated to the threaded receptacle 35 of the waste-receiving pipe 36.

The surfaces 39, 42, part of the inner peripheral surface of the adapter 34, are adapted to conform to the outer wall contour of the pipe 14 so as to be slideably matable therewith.

A circumferential groove 40 is made on the inner peripheral surface of the adapter 34, so as to create surfaces 39, 42 from a single surface, and to serve as a receptacle for an elastomeric O-ring seal 41. The O-ring seal 41 is installed in the groove 40 and the adapter sleeve 34 is slideably mated over the pipe end 16 and onto the pipe 14 body, thereby compressing the elastomeric O-ring seal 41 and effecting a fluid seal therebetween.

FIG. 3 depicts a waste connection 13 which incorporates an offset pipe portion 43 which is extremely useful in adapting the waste connection 13 to a pre-existing plumbing fixture 10 and waste-receiving pipe 36 installations. In most cases, the offset will be positioned in such a manner as to retain the offset in a vertical plane so as to accomodate standard vertical height differentials between the plumbing fixture waste outlet 31 and the waste-receiving pipe 36 opening.

While the foregoing description of a preferred embodiment of the invention describes an installation procedure or sequence, such procedure is normally used for installing a waste connection in an existing plumbing fixture installation.

In new construction, the procedure typically used for rapid, positive and convenient installation and connection is as follows.

The adapter 34 is slideably mated to the pipe 14. The compression ring and alignment yoke 17 is then bolted to the plumbing fixture 10 via the studs 28, 27, the arms 22, 21 and the receptacles 26, 25 as previously described. The plumbing fixture 10 is then moved into position on the wall 11 from the user or room area, while a helper in the pipe-chase area on the opposite side of the wall 11, guides adapter 34 into thread engagement with the threaded receptacle 35 of the waste-receiving pipe 36. The plumbing fixture 10 is then bolted or secured to the wall 11 and excess pipe 14 is pushed further into said adapter 34 and in the waste-receiving pipe 36.

While the construction above referred to is especially suitable for a rear outlet type of toilet bowl, it will be apparent that the same sort of construction is readily applicable to other types of toilet bowls and other forms of plumbing fixtures having waste outlet drains.

While this invention has been shown and described in particular arrangement merely for illustration and explanation, it will be readily apparent that the invention may be widely varied without departing from the scope and spirit of this invention.

We claim:

1. An apparatus for connecting the drain pipe of a plumbing fixture to a waste-receiving pipe, wherein the waste outlet of said drain pipe has a gasket receptacle and a fluid-sealing gasket therein, comprising:
   a pipe having at least two open ends;
   a gasket compression ring and alignment yoke, said ring attached to the body of said pipe so as to effect a structural bond and a fluid seal therebetween;
   means for adapting said gasket compression ring and alignment yoke to be connectable to a support structure on said fixture whereby said ring is movable towards or away from said gasket;
   means for aligning said compression ring with said gasket, said gasket being disposed between said receptacle and said compression ring;
   means for adjusting the compression force exerted on said gasket in said receptacle by said compression ring and alignment yoke wherein said force may be adjusted to obtain the desired fluid sealing force therebetween; and
   a sleeve slideably mated to said other pipe end in fluid-sealing relationship therewith, said sleeve adapted to be removably connected to said waste-receiving pipe.

2. The apparatus recited in claim 1, wherein said means for adapting said gasket compression ring and alignment yoke to be connectable to a support structure on said fixture whereby said ring is movable towards or away from said gasket, comprises:
   two externally threaded studs;
   two elongated slots in the outer extremities of a pair of arms, said slots being of sufficient width to permit said slots to be passed over said studs;
   two threaded anchoring receptacles, bonded to the backside of said plumbing fixture, said threaded receptacles adapted to threadably receive said threaded studs after said studs have been located in said slots; and
   two nuts adapted to be threadably mated to the ends of said studs opposite the ends of said studs which are mounted to said receptacles.

3. The apparatus recited in claim 1, wherein said means for adapting said gasket compression ring and alignment yoke to be connectable to a support structure on said fixture whereby said ring is movable towards or away from said gasket and means for aligning said compression ring with said gasket, said gasket being disposed between said receptacle and said compression ring, comprises:
   a pair of externally threaded studs;
   a pair of elongated slots in the outer extremities of a pair of arms, said slots being of sufficient width to permit said slots to be passed over said studs;
   a pair of threaded anchoring receptacles, bonded to the backside of said plumbing fixture, said threaded receptacles being adapted to threadably receive said threaded studs after said studs have been located in said slots; and
   a pair of nuts adapted to be threadably mated to the ends of said studs opposite the ends of said studs which are mounted to said receptacles.

4. The apparatus recited in claim 1, wherein said means for adapting said gasket compression ring and alignment yoke to be connectable to a support structure on said fixture whereby said ring is movable towards or away from said gasket and means for aligning said compression ring with said gasket, said gasket being disposed between said receptacle and said compression ring and means for adjusting the compression force exerted on said gasket in said receptacle by said compression ring and alignment yoke wherein said force may be adjusted to obtain the desired fluid sealing force therebetween, comprises:
   a pair of externally threaded studs;
   a pair of elongated slots in the outer extremities of a pair of arms, said slots being of sufficient width to permit said slots to be passed over said studs;
   a pair of threaded anchoring receptacles, bonded to the backside of said plumbing fixture, said threaded receptacles being adapted to threadably receive said threaded studs after said studs have been located in said slots; and
   a pair of nuts adapted to be threadably mated to the ends of said studs opposite the ends of said studs which are mounted to said receptacles.

5. The apparatus recited in claim 1, wherein said sleeve adapted to be slideably mated to said other pipe end with a fluid seal therebetween and being further adapted to be removably connectable to said waste-receiving pipe, comprises:
   a tubular body having at least two open ends, the bore of which is slightly larger than said pipe body cross-section and whose cross-section is shaped to match the contour of said pipe cross-section;
   an annular groove in the surface of said bore of said tubular body and lying in a single vertical plance, said plane being perpendicular to the axis of said tubular body, wherein said groove is adapted to receive an O-ring seal;
   an O-ring fluid seal adapted to be disposed in said groove, whereby when said bore is slideably mated to said pipe said O-ring is compressed between said bore and the outer surface of said tubular body to form a fluid seal therebetween;
   a wrench-gripping surface on the outer surface of said tubular body for enabling said body to be rotated on its axis with a wrench; and
   an externally threaded portion on the outer surface of said tubular body, wherein said threaded surface is adapted to be threadably mated into a fluid-sealing relationship with said waste-receiving pipe when said body is rotated on its axis following thread engagement therewith.

6. A vandal-proof waste outlet connection which provides a removable fluid passageway between the waste drain of an independently-supported plumbing fixture, said waste drain having a receptacle for receiving a fluid sealing gasket, and a waste-receiving pipe inlet having a threaded connection on said inlet, comprising:

a pipe having at least two open ends;

a fluid-sealing gasket adapted to be sealingly disposed in said receptacle;

a gasket compression ring and alignment yoke having at least two oppositely-disposed, radially-extending arms, said ring being adapted to be joined at one end of said pipe so as to effect a fluid seal therebetween;

means for removably connecting said alignment yoke arms to said plumbing fixture, said connecting means being inaccessible from outside of the pipe-chase area;

means for aligning said compression ring with said gasket, said gasket being disposed between said receptacle and said compression ring, said alignment means being inaccessible from outside of the pipe-chase area;

means for adjusting and connecting means, whereby the compression force on said gasket in said receptacle by said ring may be adjusted to obtain the desired fluid sealing force therebetween, said adjustment means being inaccessible from outside of the pipe-chase area;

a sleeve adapted to be slideably mated to said other end of said pipe and being further adapted to be threadably mated to said threaded connection on said waste-receiving pipe inlet;

means for said sleeve to be gripped by a wrench for rotating said sleeve on said pipe whereby said sleeve may be threadably engaged with said waste-receiving pipe threaded inlet thereby effecting a fluid seal therebetween; and means for sealing said sleeve to said pipe whereby a movable fluid seal is effected therebetween.

* * * * *